United States Patent [19]

Hsu

[11] Patent Number: 5,421,248
[45] Date of Patent: Jun. 6, 1995

[54] MULTI-FOOD PROCESSOR AND JUICE EXTRACTOR

[75] Inventor: Maxwell Hsu, Taipei, Taiwan, Prov. of China

[73] Assignee: Airlux Electrical Co., Ltd., Chai Wan, Hong Kong

[21] Appl. No.: 297,695

[22] Filed: Aug. 29, 1994

[51] Int. Cl.⁶ .......................... A23N 1/02; A47J 19/02
[52] U.S. Cl. .................................. 99/512; 99/511; 99/513; 241/37.5; 241/92; 241/282.1
[58] Field of Search .................... 99/495, 510–513, 99/484, 536, 537; 210/360.1, 380.1, 369; 241/37.5, 92, 282.1, 282.2; 366/314

[56] References Cited

U.S. PATENT DOCUMENTS

| | | | |
|---|---|---|---|
| 2,297,880 | 10/1942 | Fredrickson | 99/512 |
| 2,311,379 | 2/1943 | Gillanders | 99/512 |
| 2,845,971 | 8/1958 | Cordero | 99/512 |
| 3,892,365 | 7/1975 | Verdun | 241/282.1 X |
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 4,840,119 | 6/1989 | Caldi | 99/512 |
| 5,222,430 | 6/1993 | Wang . | |
| 5,289,763 | 3/1994 | Le Rouzic et al. | 366/314 X |

*Primary Examiner*—Timothy F. Simone
*Attorney, Agent, or Firm*—Fields, Lewis, Rost & Smith

[57] ABSTRACT

A multi-food processor and juice extractor is provided that includes a container which houses a filter assembly. The assembly is operatively connected to a shaft for rotating the assembly within the container. The food is milled within the filter assembly by a plurality of cutters integral with the assembly, and after filtering, juice and/or particulate food matter is received from a juice outlet. Food dregs collecting along an inside wall of the filter assembly is removed by a stopper. A rotary control knob is provided to place the stopper into either an engaged or disengaged position. The stopper expels the dregs by utilizing centrifugal force created by the spinning filter assembly. A spring attached to the control knob automatically returns the stopper to the disengaged position upon releasing the control knob.

12 Claims, 4 Drawing Sheets

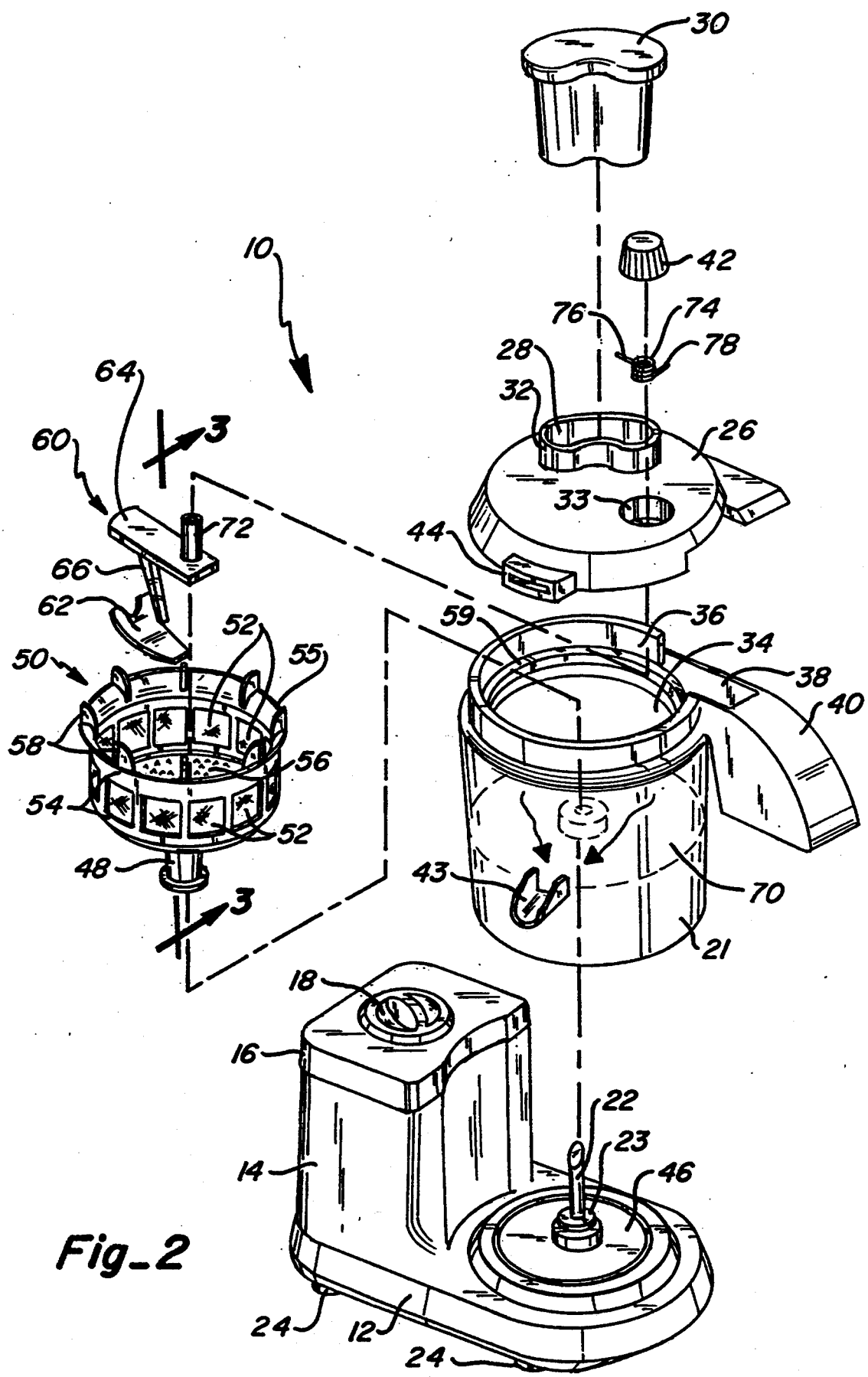
Fig_2

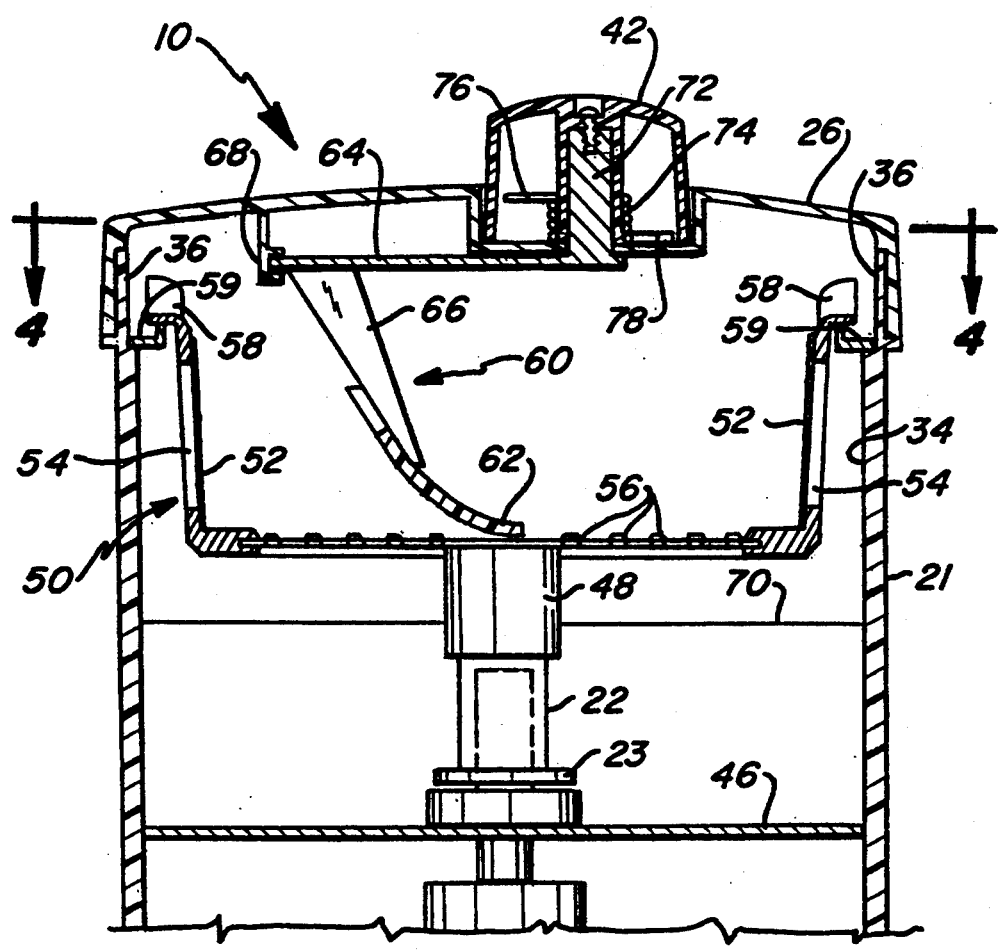
*Fig_3*
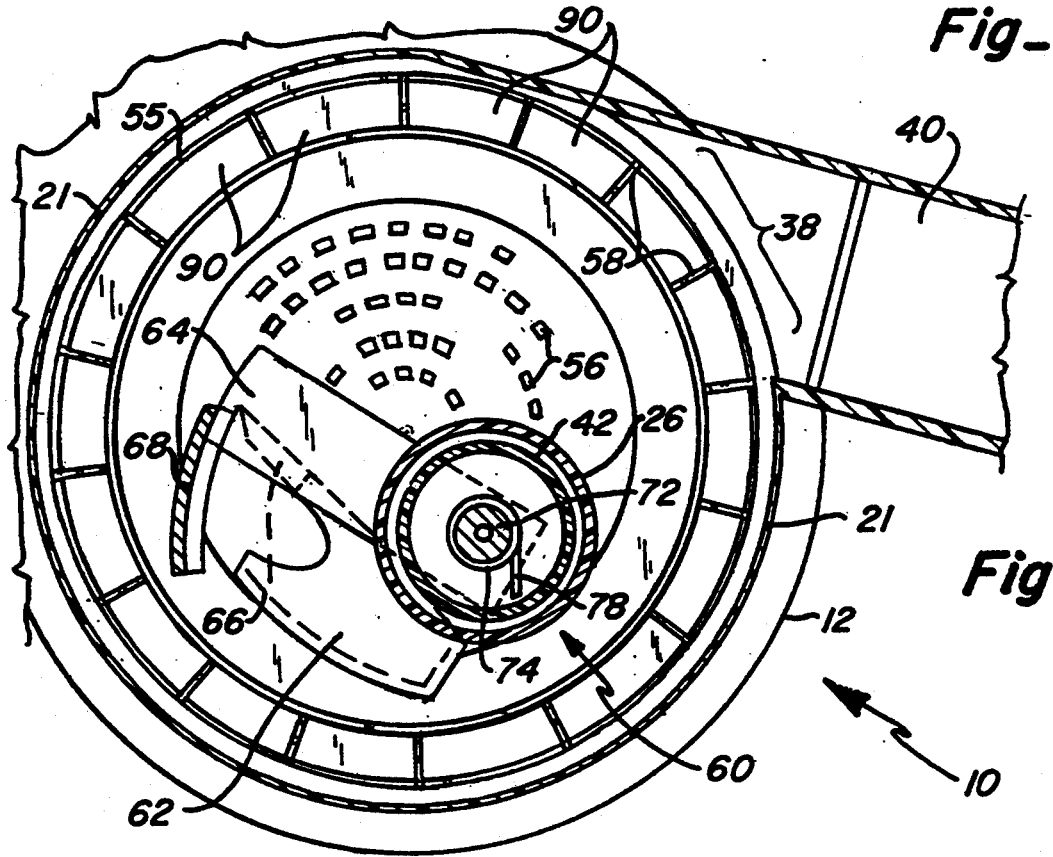
*Fig_4*

MULTI-FOOD PROCESSOR AND JUICE EXTRACTOR

TECHNICAL FIELD

This invention relates to an apparatus used for the processing of food and in particular to a device for the processing of food into juice and smaller particulate food pieces.

BACKGROUND ART

At the present time there are a number of commercially available devices for producing juice and processed food. These devices can be operated manually or are electrically powered such that the processing function is done automatically. One of the disadvantages common in the prior art has been that the food residue or dregs remaining in the device after extraction of the processed food had to be removed by manual means, thus making the traditional food processor more difficult to use. One of the objects of the present invention is to provide an improved food processor and juice extractor which automatically discharges the unwanted residue or food dregs remaining in the device.

Another disadvantage of the prior art is that they were difficult to disassemble and clean after use. Accordingly, it is another object of this invention to provide for a device that overcomes these additional drawbacks.

One example of a prior art device which provides for a means to discharge dregs is U.S. Pat. No. 5,222,430 to Wang. In this device, a dregs displacement switch expels residue or dregs via a dregs outlet incorporated within the structure of the container cover by utilization of centrifugal force. Although the device in Wang is adequate for its intended purpose, the dregs displacement switch described and claimed herein provides certain advantages over the design found in Wang. Particularly, Wang has no means to return the switch to a disengaged position after use without having to manually manipulate the switch.

The device described herein includes other novel features distinguishing it over the prior art which will become apparent from the following drawings and written description.

DISCLOSURE OF THE INVENTION

The present invention comprises an apparatus for processing food into smaller particulate pieces and juice on a scale that is convenient for domestic use. The invention includes a removable container mounted on a base. A rotation means is provided that protrudes from the base and couples with a filter assembly mounted within the container. The rotation means includes a motor which drives a belt, which in turn drives a driven shaft coupled to the filter assembly. The motor is contained in a housing that is adjacent to the base upon which the container mounts. A control switch located on the motor housing enables one to selectively adjust the speed of the driven shaft.

The container includes a container cover which may be removed to gain access to the filter assembly. The filter assembly is mounted within the container such that it may spin about an axis defined by the driven shaft protruding upwards therethrough. The lower end of the filter assembly includes a plurality of cutting elements which mill food into smaller particulate food pieces. Mounted on the upper surface of the container cover is a pusher opening for loading food into the filter assembly. A pusher is insertable within the pusher opening for forcing food into the filter assembly. The filter assembly has a transmission socket attached at the lower end which receives the driven shaft.

A dregs removal means is provided for removing residue or dregs which collect on the interior wall of the filter assembly as the filter assembly is spun. The dregs removal means includes a stopper element which is positioned within the open interior space of the filter assembly. A rotary control knob attached to the upper surface of the container cover controls the positioning of the stopper element in either an engaged or a disengaged position. In the engaged position, the stopper comes in near contact with the inner wall of the filter assembly. As the filter assembly spins while the stopper is in this position, the dregs are collected against the stopper and are forced upwardly against the interior wall of the filter assembly into a plurality of spaced compartments formed by extensions protruding from the filter assembly and the inside wall of an upper flange of the container. The upper flange has an open gap wherein as the filter assembly makes a complete rotation, the compartments filled with dregs are exposed to this open gap causing the dregs to be flung radially outward and into a dregs outlet which communicates with the open gap.

The primary advantage of this device is that the dregs removal means is automatically returned to a disengaged position when the rotary knob is released. Additionally, this advantage is achieved by a reliable and simple structure that can be manufactured inexpensively.

From the foregoing, the advantages of this invention will become readily apparent when taken in conjunction with the drawings and description which follows.

BRIEF DESCRIPTION OF THE DRAWINGS

FIG. 2 is an exploded perspective view of this device showing the filter assembly, container cover, dregs removal means and container in dissembled relationship.

FIG. 3 is a vertical section taken along line 3—3 of FIG. 1 and FIG. 2, showing the internal details and construction of the device.

FIG. 4 is a horizontal section taken along line 4—4 of FIG. 3, showing the structural details of the dregs removal means in the disengaged position;

BEST MODE FOR CARRYING OUT THE INVENTION

Figure 1:
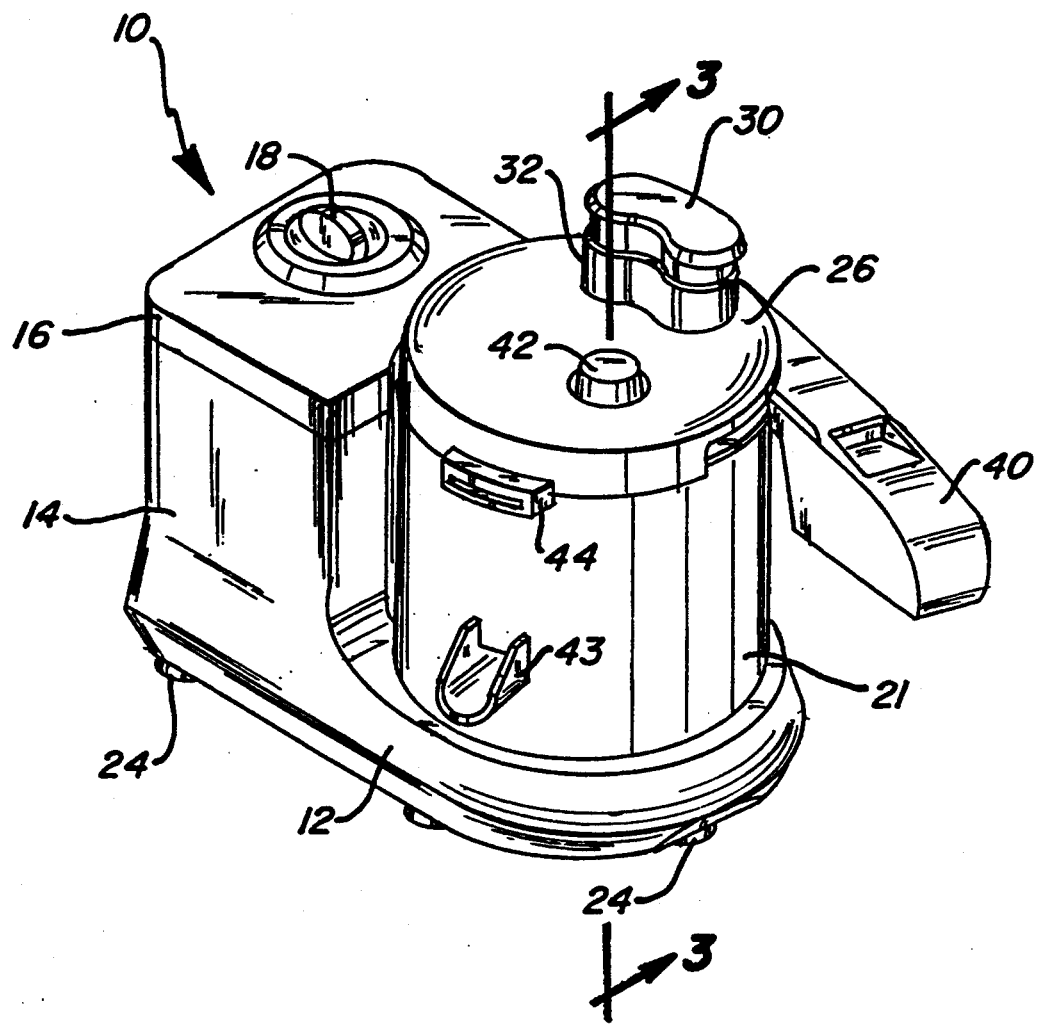
FIG. 1 is a perspective view of the multi-food processor and juice extractor of this device.

As shown in FIGS. 1 and 2, the multi-food processor and juice extractor 10 includes a base 12 and motor housing 14 mounted thereupon at one end. On the other end of the base 12 is mounted a container 21. The motor housing 14 further includes a housing cover 16 and control switch 18 that is electrically coupled with motor 20 for controlling the speed of the driven shaft 22. A plurality of feet 24 are provided on the bottom side of base 12 for stabilizing the device.

The container 21 includes a removable container cover 26 which mounts thereupon. A pusher opening 28 is formed on the container cover which receives a pusher 30 in aligned relationship thereto by pusher guide 32. The container has an interior wall 34 and an upper flange 36 that extends around the diameter of the container except for an open gap 38 that occupies a small portion of the container diameter and which communicates with a dregs outlet 40. A rotary control knob 42 attached to the cover 26 controls a stopper element 62 which will be more fully described below. An outlet 43 is provided on the exterior wall of the container 21 for removing processed juice and particulate food pieces from the device. A handle 44 is provided on the container cover 26 enabling one to remove the cover 26 from the container 21.

As shown in FIG. 2, seat 46 is provided as the surface for receiving the container 21. Driven shaft 22 protrudes vertically upward from seat 46 and operatively engages shaft coupling 48 of filter assembly 50. Driven shaft 22 includes a shaft seal 23 to prevent migration of oil or other shaft lubricants to the seat 46.

Filter assembly 50 includes a plurality of filter elements 52 disposed between vertical sections of filter housing 54. The lower end of filter assembly 50 includes a plurality of protruding cutting blades 56 which serve to mill food into smaller particulate pieces. Housing extensions 58 are spacially arranged and protrude above the top edge 55 of filter assembly 50. The filter assembly 50 is mounted on support ridge 59, shown in FIG. 3, which protrudes radially inward from the interior wall 34 of container 21. Positioned below filter assembly 50 is a catch means defined by sloping surface 70 for catching filtered juice and particulate food pieces emanating from filter assembly 50.

Figure 4A:
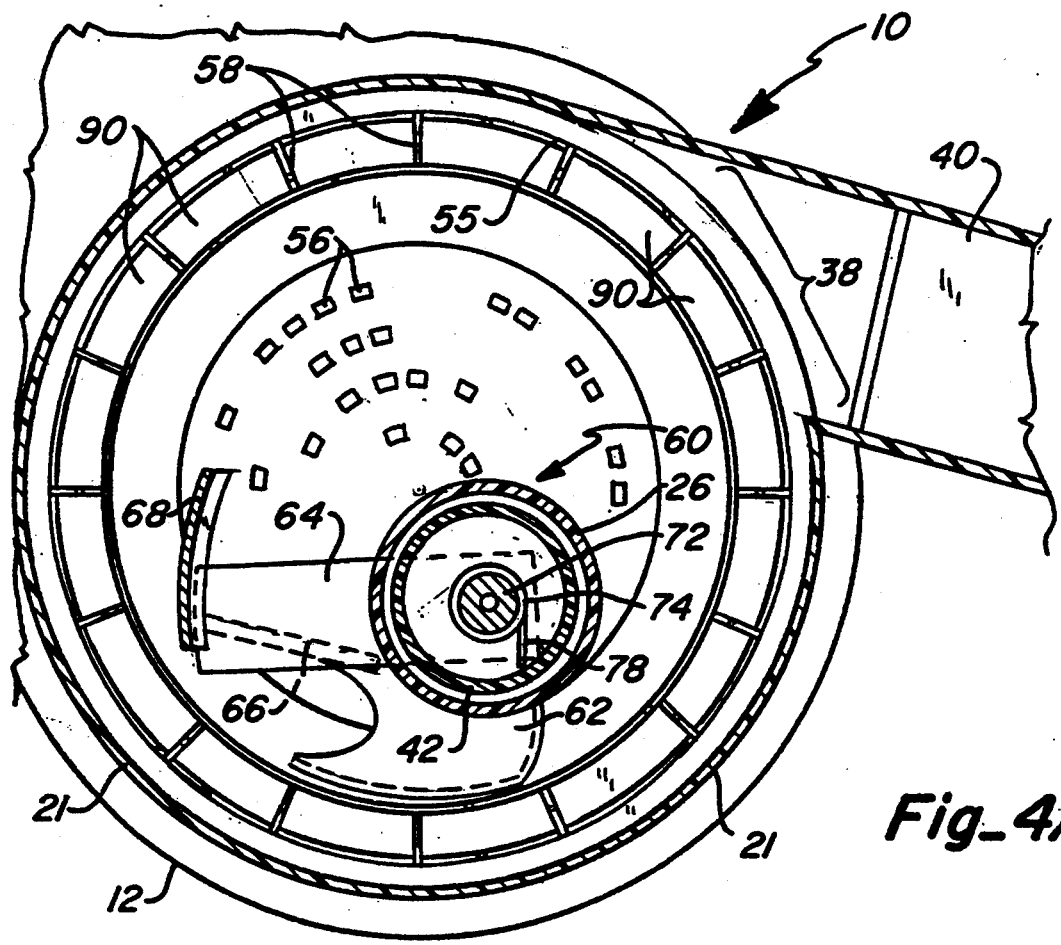
FIG. 4A is another horizontal section taken along line 4—4 of FIG. 3, but showing the dregs removal means in the engaged position.

As shown in FIGS. 2 and 3, dregs removal means 60 includes a stopper element 62 which is inserted within the interior space of filter assembly 50. Stopper 62 is shaped so that its lower end comes in near contact with the lower end of assembly 50 and its upper end positioned approximately the same vertical height as the upper ends of the filter elements 52. Although the preferred embodiment illustrates the stopper 62 in a shovel-like shape, it will be understood that it can be modified to accommodate the desired dregs removal action by changing the stopper configuration. That is, a larger stopper positioned in closer proximity to the interior wall of the filter assembly 50 will more quickly remove dregs than a smaller stopper whose engaged position is further away from the interior wall. Stopper 62 is connected to stopper support 64 by means of connector 66 wherein support 64 traverses horizontally across and below the bottom surface of container cover 26. A channelled guide 68 is attached to the bottom surface of container cover 26 and serves to guide movement of stopper support 64 in a radial direction in relation to the rotary knob 42. Stopper support 64 is attached at one end to vertical extension 72 which protrudes upwardly into the interior of rotary knob 42 and fixedly attaches thereto. A coiled spring 74 is placed over extension 72 wherein the spring 74 includes upper and lower extensions, 76 and 78 respectively. Upper extension 76 is rigidly attached to rotary knob 42 and lower extension 78 is rigidly attached to the interior wall of knob opening 33. When the rotary knob 42 is turned such that the stopper 62 is placed in the engaged position, as shown in FIG. 4A, the spring 74 places a resisting moment on the knob 42 because lower extension 78 is held in place and upper extension 76 remains rigidly fixed to knob 42. After dregs removal has been achieved, the rotary knob 42 is released and the spring 74 automatically returns the stopper 62 to the disengaged position as shown in FIG. 4.

Again referring to FIG. 4, a plurality of dregs receiving compartments 90 are created by the confined space formed by housing extensions 58, the top edge 55 of filter assembly 50 and the interior side of upper flange 36 of container 21.

Figure 5:
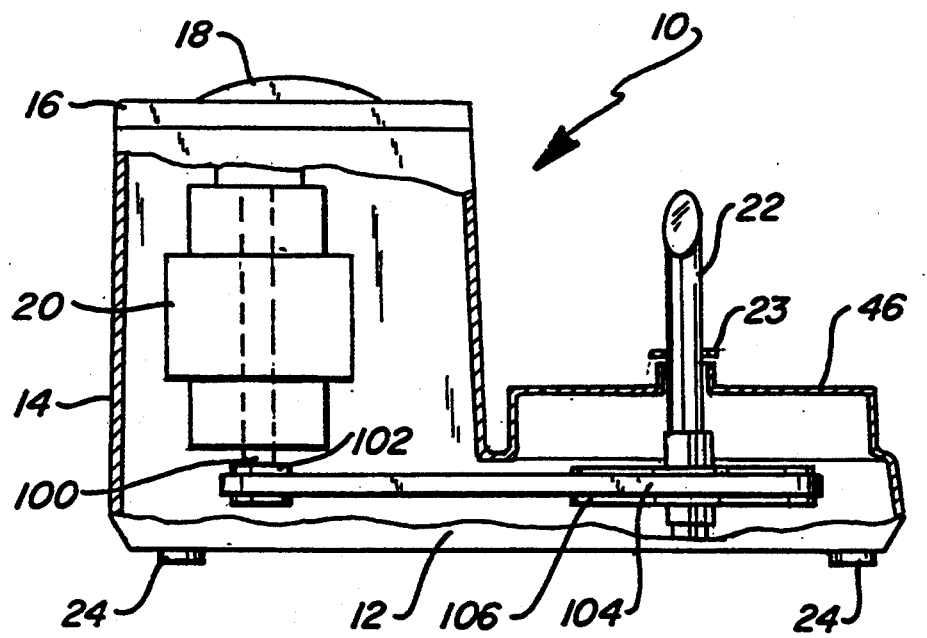
FIG. 5 is a partially cut-away side elevation view of the device showing the internal construction of the rotation means.

Referring to FIG. 5, driven shaft 22 is powered by motor 20. Motor 20 includes a drive shaft 100 which extends downwardly and attaches to shaft pulley 102. Pulley 102, in turn, drives belt 104 which then drives driven pulley 106 that is attached to driven shaft 22.

The operation of the foregoing device can be explained as follows: First, food is inserted through the pusher opening 28. Control switch 18 is turned on to the desired speed setting causing filter assembly 50 to spin within container 21. Pusher 30 is placed inside opening 28 and pressure is applied to the pusher 30 to press the food against cutting blades 56. The milling action by the blades 56 breaks the introduced food into smaller particulate food pieces thus releasing juice contained therein. The centrifugal force created by the spinning filter assembly 50 causes passable particulate food pieces and juice to be flung against and through the filter elements 52. Of course, the mesh size of the filter elements 52 can be changed to accommodate the needed consistency of juice and food particles to be extracted for consumption. After the particulate food pieces and juice have passed through the filter elements 52, they then travel downwards by gravity to the catch means defined by sloping surface 70. Surface 70 slopes downwardly in communication with the outlet 43. Above sloping surface 70 may be placed a secondary filter to provide additional filtration for the particulate food pieces and juice passing through primary filter elements 52.

Once the desired particulate food pieces and juice have been obtained through the juice outlet 43, it may be necessary to clean the interior wall of filter elements 52 from food pieces that have collected thereon. To do this, rotary knob 42 is rotated such that stopper 62 is positioned in near contact with the filter elements 52. As the filter assembly 50 continues to rotate, the dregs will begin to be pushed up vertically along the interior wall of the filter elements 52 and against stopper 62 due to the upward sloping configuration of the stopper 62. The dregs will then be collected within dregs compartments 90 formed by the structure previously described. When a dregs compartment 90 rotates to a position in communication with the open gap 38, the dregs contained therein are flung outwardly away from the filter assembly 50 and into dregs outlet 40 due to the centrifugal force created by the spinning filter assembly 50. Once the dregs have been adequately removed from the interior wall of the filter elements 52, rotary knob 42 may be released wherein the stopper 62 automatically returns to the disengaged position. Additional food may then be introduced within the container for further processing. To completely clean the filter assembly 50, the container cover 26 may be removed from the container 21 and the filter assembly 50 may be simply lifted out and appropriately rinsed or cleaned.

The advantages of the device disclosed herein are apparent. A device is provided to process food and extract juice wherein dregs removal can be achieved with a structurally simple and reliable means. The coiled spring 74 ensures that the dregs removal means 60 remains in a completely disengaged position unless rotary knob 42 is positively controlled to place the dregs removal means in an engaged position. Additionally, the removable container cover and filter assembly enable the device to be easily cleaned and maintained.

This invention has been described in detail with reference to a particular embodiment thereof, but it will be understood that various other modifications can be affected within the spirit and scope of this invention.

I claim:

1. A multi-food processor and juice extractor for preparing processed food comprising:
   a container having a removable cover for receiving food to be processed;
   a filter assembly having an outer cylindrical wall and a bottom end, said assembly insertable within said container, said assembly including a milling means integral with said bottom end for reducing the food into smaller particulate food pieces and juice, and a filter element disposed around said outer wall for filtering the milled particulate food pieces and juice;
   a rotation means connected to said filter assembly for rotating said assembly within said container;
   a catch means in communication with said filter assembly for catching the particulate food pieces and juice filtered from said filter element;
   a dregs removal means in operative engagement with said filter assembly for removing food dregs from said filter element after the particulate food pieces and juice have been filtered, said dregs removal means including a stopper means disposed within said assembly and movable along a radial direction from a disengaged position to an engaged position, and a rotatable control means attached to said stopper means for selectively moving said stopper to the engaged or disengaged position; and
   an outlet port connected to said catch means for removal of the filtered particulate food pieces and juice.

2. An apparatus, as claimed in claim 1, wherein said dregs removal means further includes:
   a plurality of dregs removal extensions protruding from said filter assembly and arranged in spaced relation thereto, said rotation means causing said dregs to be collected between said extensions when said stopper is in the engaged position 3. An apparatus, as claimed in claim 1, wherein said stopper includes:
   an upper end and a lower end, said lower end being disposed at a vertical angle from said upper end in order to force dregs to be vertically raised along said cylindrical wall and to be collected between said extensions when said rotation means rotates said filter assembly.

4. An apparatus, as claimed in claim 1, further including:
   a control switch operatively coupled with said rotation means for adjusting the speed of rotation of said rotation means.

5. An apparatus, as claimed in claim 1, wherein said catch means includes:
   a sloping surface in communication with said outlet port such that particulate food pieces and juice flow by gravity force to said outlet port for removal.

6. An apparatus, as claimed in claim 1, wherein said milling means includes:
   a support surface attached to said bottom end of said filter assembly; and
   a plurality of cutting members protruding from said surface.

7. An apparatus, as claimed in claim 2, further including:
   a dregs outlet in communication with said extensions along a portion of the path of rotation of said filter assembly such that when said dregs collect therebetween, the rotational force created by the rotation of said filter assembly causes the dregs to be forced radially away from said filter assembly into said dregs outlet.

8. Apparatus, as claimed in claim 1, wherein said rotatable control means includes:
   a rotatable control knob; and
   a biasing means operatively attached to said knob such that said biasing means provides a resisting moment against said knob when said knob is operated to move said stopper means to the engaged position, said biasing means causing said stopper means to return to the disengaged position when said knob is released.

9. A multi-food processor and juice extractor for preparing processed food comprising:
   a container for receiving food to be processed;
   a pusher connected to said container for pressing the food into said container;
   a filter assembly disposed within said container, said assembly having an upper end, a lower end, and a cylindrical side wall, said upper end aligned to receive food to be processed, said cylindrical side wall having a filter element positioned therearound, said lower end having a milling means for reducing the food into smaller particulate food pieces and juice, said filter element filtering juice and passable particulate food pieces milled by said milling means;
   a rotation means connected to said filter assembly for rotating said filter assembly within said container;
   a catch means in communication with said filter assembly for catching the particulate food pieces and juice filtering through said filter element;
   a dregs removal means in operative engagement with said filter assembly for removing food dregs from said assembly after the particulate food pieces and juice have been filtered, said dregs removal means including a stopper disposed within said assembly and movable along a radial direction from a disengaged position to an engaged position, a stopper support attached to said stopper for stabilizing said stopper within said assembly, and a rotatable control means attached to said stopper support for selectively moving said stopper to the engaged or disengaged position; and
   an outlet port connected to said catch means for removal of the filtered particulate food pieces and juice.

10. Apparatus, as claimed in claim 9, wherein said rotatable control means includes:
    a rotatable control knob; and
    a biasing means operatively attached to said knob such that said biasing means provides a resisting moment against said knob when said knob is operated to move said stopper means to the engaged position, said biasing means causing said stopper means to return to the disengaged position when said knob is released.

11. A multi-food processor and juice extractor for preparing processed food comprising:
 a container for receiving food to be processed;
 a removable container cover having an upper and lower surface, said cover attachable to said container;
 a pusher receivable over said cover for pressing food into said container;
 a milling means in operative communication with said pusher for reducing said food into smaller particulate pieces and for extracting juice contained within the food;
 a filter assembly attached to said milling means, said assembly and said milling means insertable within said container, said assembly having a cylindrical wall and a filter element disposed therearound for filtering the particulate food pieces and juice milled by said milling means;
 a catch means in communication with said filter assembly for catching the filtered food and juice filtering through said filter element;
 a rotation means coupled with said filter assembly and said milling means for rotation of said filter assembly and said milling means within said container;
 dregs removal means in operative engagement with said filter assembly for removing food dregs from said filter element after said particulate food pieces and juice have been filtered, said dregs removal means including a stopper disposed within said filter assembly and movable along a radial direction from a disengaged position to an engaged position in near contact with said filter element, a stopper support attached to said stopper for stabilizing said stopper within said filter assembly, a stopper guide positioned on said bottom surface of said cover and in contact with said stopper support for channeling movement of said stopper in the radial direction, and a rotatable control means attached to said stopper support for selectively moving said stopper to the engaged or disengaged position; and
 an outlet port connected to said catch means for removal of the filtered particulate food and juice.

12. Apparatus, as claimed in claim 11, wherein said rotatable control means includes:
 a rotatable control knob; and
 a biasing means operatively attached to said knob such that said biasing means provides a resisting moment against said knob when said knob is operated to move said stopper means to the engaged position, said biasing means causing said stopper means to return to the disengaged position when said knob is released.

* * * * *